US012248258B2

(12) United States Patent
Tatezawa et al.

(10) Patent No.: US 12,248,258 B2
(45) Date of Patent: Mar. 11, 2025

(54) IMAGE FORMING APPARATUS HAVING FIXING DEVICE WITH CASING AND SUCTION DUCT

(71) Applicant: Canon Kabushiki Kaisha, Tokyo (JP)

(72) Inventors: Hidekazu Tatezawa, Saitama (JP); Youichi Chikugo, Chiba (JP); Rikiya Takemasa, Chiba (JP); Yutaro Tsuno, Tokyo (JP); Takeshi Kozuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 17/364,993

(22) Filed: Jul. 1, 2021

(65) Prior Publication Data

US 2022/0017317 A1 Jan. 20, 2022

(30) Foreign Application Priority Data

Jul. 17, 2020 (JP) ................................ 2020-123051

(51) Int. Cl.
*G03G 15/20* (2006.01)
*G03G 21/16* (2006.01)
*G03G 21/20* (2006.01)

(52) U.S. Cl.
CPC ..... *G03G 15/2017* (2013.01); *G03G 21/1685* (2013.01); *G03G 21/206* (2013.01);
(Continued)

(58) Field of Classification Search
CPC ........... G03G 15/2017; G03G 15/6573; G03G 21/1633; G03G 21/1685; G03G 21/206;
(Continued)

(56) References Cited

U.S. PATENT DOCUMENTS 6,314,267 B1 * 11/2001 Kida .................... G03G 15/231 399/407
7,603,050 B2 * 10/2009 Kim ..................... G03G 21/206 399/92

(Continued)

FOREIGN PATENT DOCUMENTS

JP 58154867 A 9/1983
JP 08211819 A 8/1996

(Continued)

OTHER PUBLICATIONS

Japanese Office Action issued Dec. 19, 2023 in counterpart Japanese Application No. 2020-123051.

*Primary Examiner* — Robert B Beatty
(74) *Attorney, Agent, or Firm* — Venable LLP

(57) ABSTRACT

An image forming apparatus includes an apparatus body, a rotatable first rotary member, a rotatable second rotary member, a casing, a sheet discharge port, an opening and closing member, a duct, and a fan. The casing is provided within the apparatus body and storing the first and second rotary members. The sheet discharge port discharges the recording material that has passed through the nip portion out of the casing. The opening and closing member has the sheet discharge port and opens a conveyance path of the recording material from the nip portion to the sheet discharge port. The fan suctions air from the suction port through the duct. The duct is provided on the opening and closing member and comprises a suction port to suction air from the conveyance path. The suction port is provided on the same side as the first rotary member with respect to the conveyance path.

14 Claims, 9 Drawing Sheets

(52) U.S. Cl.
CPC . *G03G 15/2064* (2013.01); *G03G 2221/1639* (2013.01); *G03G 2221/1645* (2013.01)

(58) Field of Classification Search
CPC ... G03G 2221/1645; G03G 2221/1639; G03G 2221/1687; G03G 2221/169; G03G 15/6582; G03G 2215/00426; B41J 29/377
USPC ........................................... 399/92, 122, 407
See application file for complete search history.

(56) References Cited

U.S. PATENT DOCUMENTS

| | | | | |
|---|---|---|---|---|
| 10,162,303 | B2 * | 12/2018 | Kataoka | G03G 21/1685 |
| 2006/0147223 | A1 * | 7/2006 | Nishimura | G03G 21/203 399/92 |
| 2013/0108308 | A1 * | 5/2013 | Kondo | G03G 15/2017 399/92 |
| 2015/0063858 | A1 * | 3/2015 | Nakamura | G03G 21/206 399/94 |
| 2015/0098723 | A1 * | 4/2015 | Mitorida | G03G 21/206 399/92 |
| 2018/0088499 | A1 * | 3/2018 | Inada | G03G 15/2017 |
| 2019/0302690 | A1 * | 10/2019 | Midorikawa | G03G 15/2064 |

FOREIGN PATENT DOCUMENTS

| | | | | |
|---|---|---|---|---|
| JP | 2010181667 | A | | 8/2010 |
| JP | 2011107219 | A | | 6/2011 |
| JP | 2011232427 | A | * | 11/2011 |
| JP | 2015200814 | A | | 11/2015 |
| WO | 2019045120 | A1 | | 3/2019 |

* cited by examiner

IMAGE FORMING APPARATUS HAVING FIXING DEVICE WITH CASING AND SUCTION DUCT

BACKGROUND OF THE INVENTION

Field of the Invention

The present invention relates to a fixing unit and an image forming apparatus applicable to an electro-photographic or an electrostatic recording image forming apparatus.

Description of the Related Art

Hitherto, an image forming apparatus adopting an electro-photographic system including a fixing unit is widespread. Such fixing unit fixes a toner image onto a recording material by conveying the recording material through a nip portion between two rotary members and by applying heat and pressure to the toner image to melt toner and press onto the recording material. The recording material contains moisture, and there is a possibility that the moisture contained in the recording material evaporates as vapor because the recording material is heated by the fixing unit. In a case where humidity in air is high in particular, a moisture content is large and an amount of vapor generated from the recording material increases. Accordingly, there is a possibility that dew condensation is generated on a guide plate of a sheet discharge path by the vapor of the recording material discharged out of the fixing unit in the conventional image forming apparatus. Thereby, there are likely to cause troubles such as conveyance failures by which conveyance of the recording material is not smoothly performed and image defects caused by the dew condensed on the guide plate adheres on the recording material.

In order to solve the abovementioned problem, there is proposed an idea of providing an exhaust unit downstream in the sheet conveyance direction of the fixing unit to prevent the dew condensation of the vapor generated from the recording material after passing through the fixing nip portion. For instance, Japanese Patent Application Laid-open No. S58-154867 discloses an image forming apparatus in which a fan for blowing air to a sheet discharge path is provided as an exhaust unit downstream in a sheet conveyance direction of a fixing unit. This image forming apparatus is so arranged that no vapor adheres on a guide plate by blowing air to the sheet discharge path even if vapor is generated from a hot recording material discharged out of the fixing unit. Japanese Patent Application Laid-open No. H08-211819 discloses an image forming apparatus in which a suction duct is provided as an exhaust unit on a guide plate of a post-processing apparatus in a case where the post-processing apparatus is installed to the image forming apparatus. The post-processing apparatus is so arranged that no vapor adheres on the guide plate of the post-processing apparatus by the suction duct even if vapor is generated from a hot recording material discharged out of the fixing unit.

However, the image forming apparatus described in Japanese Patent Application Laid-open No. S58-154867 and the post-processing apparatus described in Japanese Patent Application Laid-open No. H08-211819 exhausts the moisture of the recording material downstream in the sheet conveyance direction of the fixing unit. Due to that, a space for forming a flow of air by the exhausting unit is required downstream in the sheet conveyance direction of the fixing unit. As a result, a distance from the nip portion of the fixing unit to a sheet discharge port of the recording material tends to be long. Then, such a configuration that permits to provide a duct for exhausting moisture even if the distance from the fixing nip portion of the fixing unit to the sheet discharge port of the recording material is short has been desirable.

The present disclosure aims at providing a configuration which permits to provide a duct for exhausting moisture even if a distance between a nip portion of a fixing unit and sheet discharge port of a recording material is short.

SUMMARY OF THE INVENTION

According to an aspect of the present invention, an image forming apparatus includes an apparatus body, a rotatable first rotary member configured to come into contact with a toner image formed on a recording material and to heat and fix the toner image onto the recording material, a rotatable second rotary member configured to form a nip portion to nip and convey the recording material together with the first rotary member, a casing provided within the apparatus body and storing the first and second rotary members, a sheet discharge port configured to discharge the recording material that has passed through the nip portion out of the casing, an opening and closing member comprising the sheet discharge port and configured to open a conveyance path of the recording material from the nip portion to the sheet discharge port, a duct provided on the opening and closing member and comprising a suction port to suction air from the conveyance path, and a fan configured to suction air from the suction port through the duct. The suction port is provided on the same side as the first rotary member with respect to the conveyance path.

Further features of the present invention will become apparent from the following description of exemplary embodiments with reference to the attached drawings.

DESCRIPTION OF THE EMBODIMENTS

First Exemplary Embodiment

A first exemplary embodiment of the present disclosure will be described in detail with reference to FIGS. 1 through 5B. A tandem-type full-color printer will be described as one example of an image forming apparatus 1. However, the present disclosure is not limited to be the tandem-type image forming apparatus 1 and may be another type image forming apparatus. Still further, the present disclosure is not limited to be the full-color image forming apparatus and may be a monochromatic or a mono-color image forming apparatus.

Image Forming Apparatus

Figure 1:
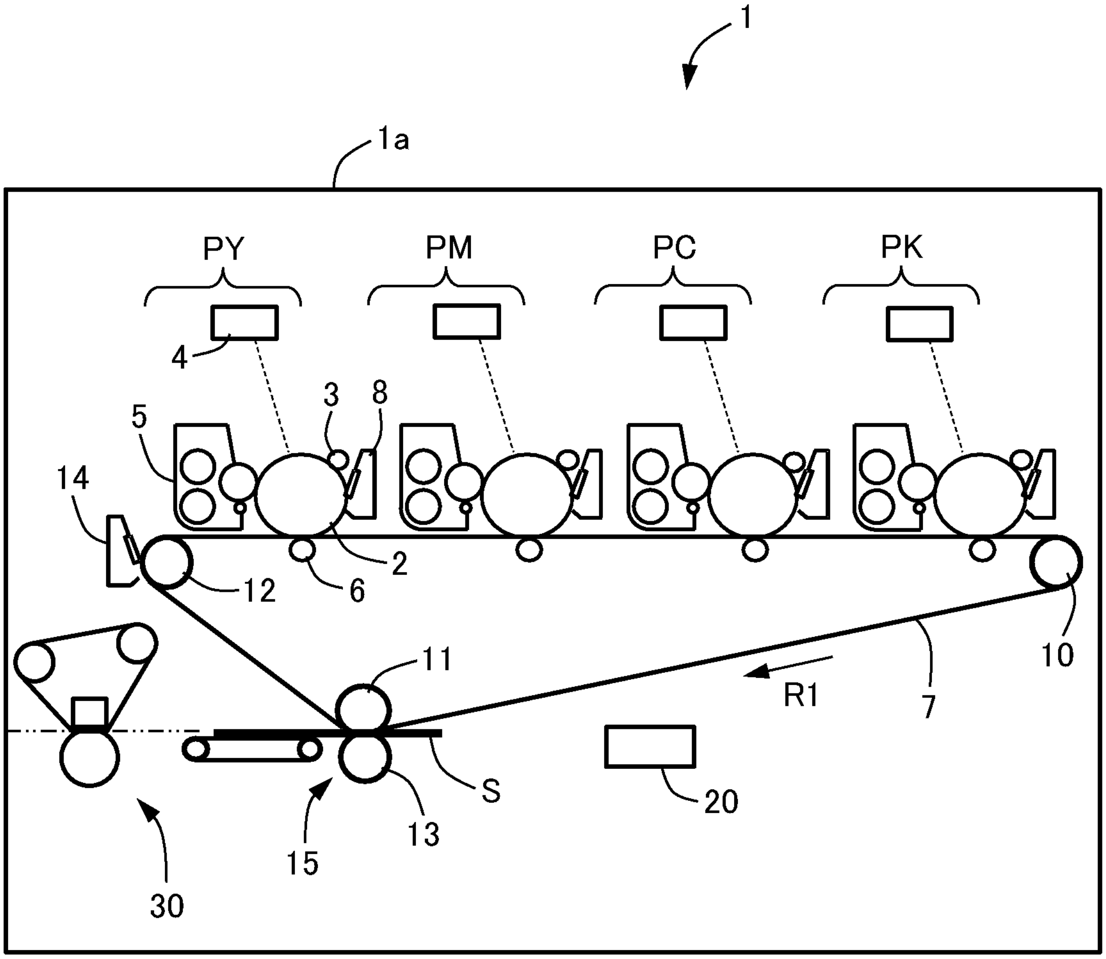
FIG. 1 is a section view illustrating a schematic configuration of an image forming apparatus of a first exemplary embodiment.

As illustrated in FIG. 1, the image forming apparatus 1 is an electro-photographic full-color printer including image forming units PY, PM. PC and PK of four colors of yellow (Y), magenta (M), cyan (C) and black (K) within an apparatus body 1*a* of the image forming apparatus 1. The present exemplary embodiment adopts an intermediate transfer tandem system in which the image forming units PY, PM, PC and PK are arrayed along a rotation direction of an intermediate transfer belt 7 described later. The image forming apparatus 1 forms a toner image, i.e., an image, onto a recording material S corresponding to an image signal transmitted from a host device such as a document reading apparatus not illustrated and connected to the apparatus body 1*a* and a personal computer communicably connected to the apparatus body 1*a*. The recording material S is a sheet member such as a sheet of paper, a plastic film and a cloth. The image forming apparatus 1 also includes a control portion 20 for executing various controls of an image forming process and others.

The image forming process of the image forming units will be described. Firstly, the image forming units PY PM, PC and PK will be described. In the present exemplary embodiment, because the image forming units PY, PM, PC and PK are constructed approximately in the same manner except that colors of toners are different, the following description will be made by typically exemplifying the yellow image forming unit PY and by omitting descriptions of the other image forming units PM, PC and PK.

The image forming unit PY includes a photosensitive drum 2, a charging unit 3, an exposing unit 4 and a developing unit 5. A surface of the photosensitive drum 2 serving as one example of a rotationally driven image bearing member is homogeneously charged in advance by the charging unit 3, and then, an electrostatic latent image is formed on the surface of the photosensitive drum 2 by the exposing unit 4 driven based on image information signals. That is, the electrostatic latent image is formed on the photosensitive drum 2. The electrostatic latent image thus formed on the photosensitive drum 2 is developed by the developing unit 5 by toner and is visualized as a toner image. An amount of the toner within the developer consumed in the image forming process is replenished from a toner cartridge not illustrated together with carrier.

After that, a predetermined pressure and a primary transfer bias are applied to the toner image formed on the photosensitive drum 2 by a primary transfer roller 6 disposed so as to face the photosensitive drum 2 across the intermediate transfer belt 7 to primarily transfer the toner image to the intermediate transfer belt 7. Residual toner slightly left on the photosensitive drum 2 after the primary transfer is removed by a cleaning unit 8 to be ready for a next image forming process.

The intermediate transfer belt 7 is stretched by a tension roller 10, a secondary transfer inner roller 11 and a driving roller 12 and is driven by the driving roller 12 such that the intermediate transfer belt 7 moves in a rotation direction R1. The image forming processes of the respective colors performed by the image forming units PY, PM, PC and PK are carried out with timing of sequentially overlapping on each color toner image primarily transferred on the intermediate transfer belt 7 upstream in the moving direction. As a result, finally a full-color toner image is formed on the intermediate transfer belt 7 and is conveyed to a secondary transfer portion 15. The secondary transfer portion 15 is a transfer nip portion formed by a part of the intermediate transfer belt 7 stretched by the secondary transfer inner roller 11 and a secondary transfer outer roller 13. It is noted that transfer residual toner after passing through the secondary transfer portion 15 is removed out of the intermediate transfer belt 7 by a transfer cleaning unit 14.

A conveyance process of the recording material S to the secondary transfer portion 15 is synchronously executed with the forming process of the toner image sent to the secondary transfer portion 15. In the conveyance process, the recording material S is fed from a sheet cassette or the like not illustrated and is sent to the secondary transfer portion 15 synchronously with the image forming timing. A secondary transfer voltage is applied to the secondary transfer inner roller 11 at the secondary transfer portion 15.

The toner image is thus secondarily transferred from the intermediate transfer belt 7 onto the recording material S at the secondary transfer portion 15 by the image forming process and the conveyance process. That is, the image forming unit forms the toner image onto the photosensitive drum 2 and the toner image born on the photosensitive drum 2 is transferred onto the recording material S. After that, the recording material S is conveyed to a fixing unit 30 to be heated and pressurized by the fixing unit 30 such that the toner image is melt and fixed onto the recording material S. That is, the fixing unit 30 fixes the unfixed toner image that has been formed by the image forming unit onto the recording material S. The recording material S onto which the toner image has been thus fixed is discharged by a discharge roller onto a discharge tray not illustrated.

Control Portion

The image forming apparatus 1 includes a control portion 20 for executing various controls such as the image forming process described above. That is, the control portion 20 provided in the image forming apparatus 1 controls operations of the respective portions thereof. The control portion 20 controls the series of image forming operations in accordance with an operating portion provided on an upper surface of the apparatus body 1*a* or with each input signal transmitted through a network.

Figure 2:
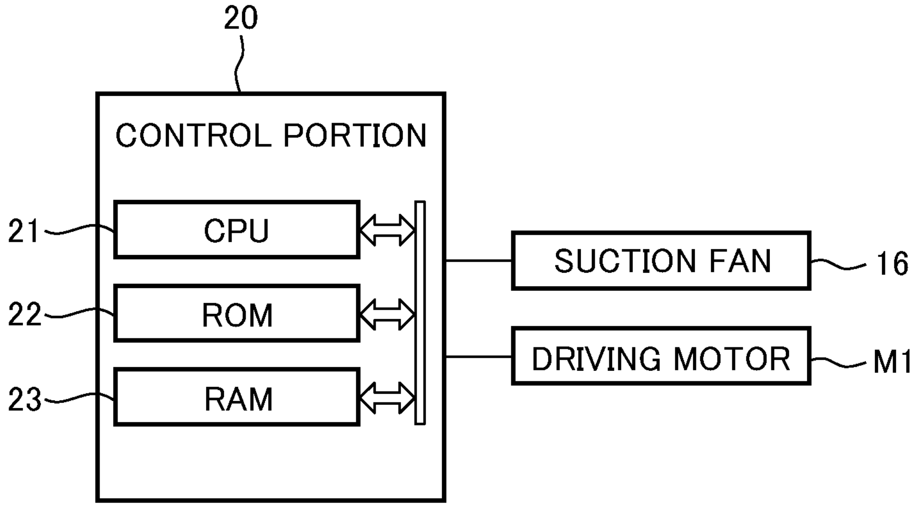
FIG. 2 is a control block diagram of the image forming apparatus of the first exemplary embodiment.

As illustrated in FIG. 2, the control portion 20 includes a Central Processing Unit (CPU) 21 serving as an arithmetic operation unit, a Read Only Memory (ROM) 22, a Random Access Memory (RAM) 23 and others. The CPU 21 controls the respective portions of the image forming apparatus 1 while reading out a program corresponding to a control procedure stored in the ROM 22. The RAM 23 stores operational data and input data, and the CPU 21 controls by making reference to the data stored in the RAM 23 based on the abovementioned program. The control portion 20 is connected with a suction fan 16 described later, a driving motor MI for driving a fixing belt 41 and others and is capable of controlling the fixing unit 30.

Fixing Unit

Figure 3:
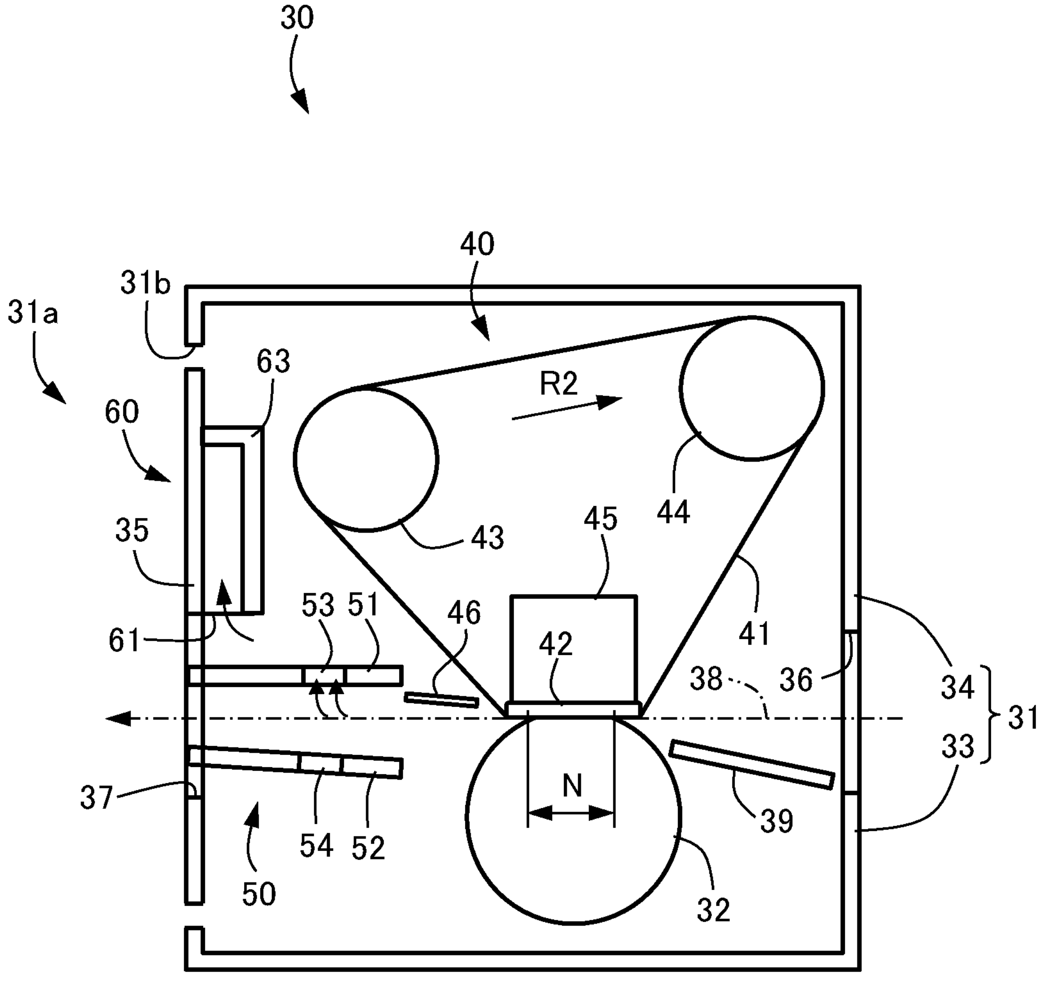
FIG. 3 is a section view illustrating a schematic configuration of a fixing unit of the first exemplary embodiment.
Figure 8:
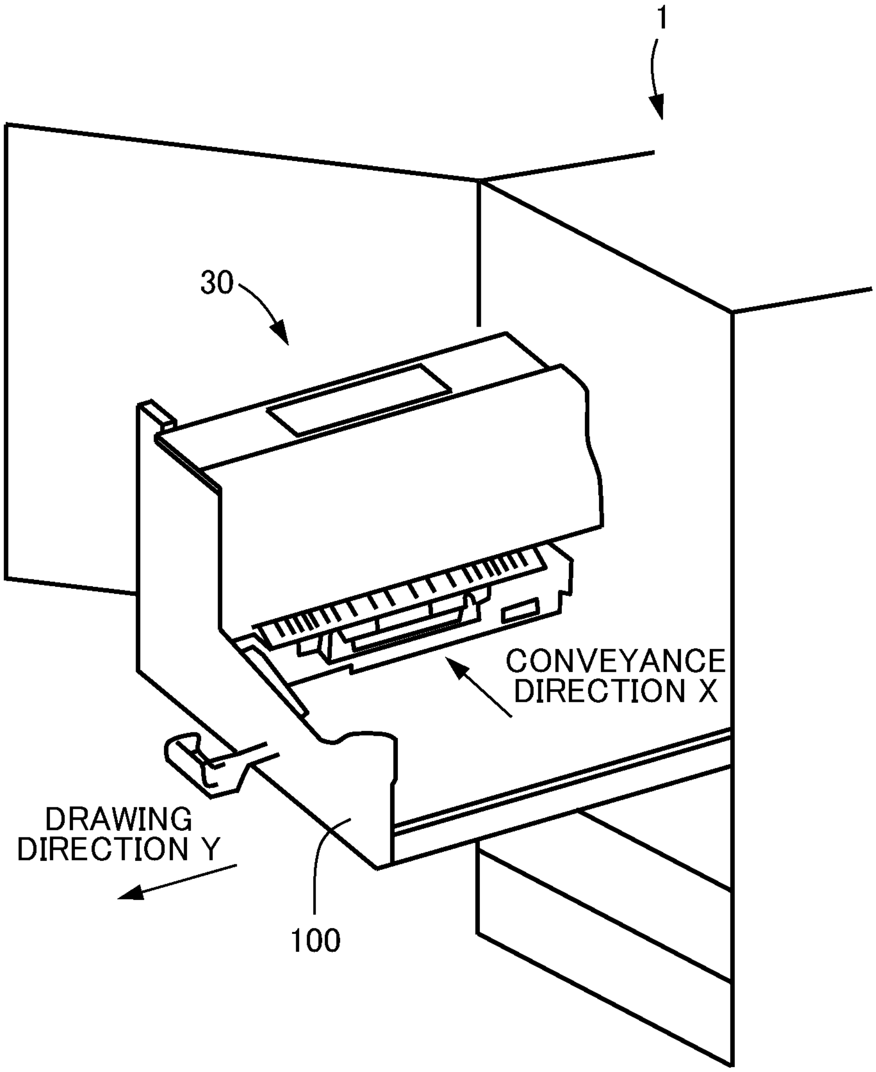
FIG. 8 is a perspective view illustrating a state in which the fixing unit according to the first exemplary embodiment is drawn out of the image forming apparatus.

Next, the fixing unit 30 will be described in detail with reference to FIG. 3. As illustrated in FIG. 3, the fixing unit 30 is constructed in a manner of a cartridge attachable to/detachable from the apparatus body 1*a* of the image forming apparatus 1 (see FIG. 1). The fixing unit 30 includes a casing 31, a heating portion 40, a pressure roller 32 which is one example of a second rotary member, a discharge side guide portion 50 and an air duct 60. As illustrated in FIG. 8, the fixing unit 30 is supported by a drawing portion 100 that can be drawn out of the apparatus body 1*a* of the image forming apparatus 1.

The heating portion 40 includes a fixing belt 41 which is one example of a first rotary member endlessly rotatable in a rotation direction R2, a pressure pad 42 which is a nip forming member, a heating roller 43, a steering roller 44 and a stay 45. The respective components described above of the heating portion 40 are integrated into a cartridge by unit side plates not illustrated and the heating portion 40 is detachably attached to the casing 31.

The fixing belt 41 is a thin and cylindrical belt member having thermal conductivity, heat resistance and others and configured to come into contact with the recording material S to heat the recording material S. According to the present exemplary embodiment, the fixing belt 41 has a three layer structure of a base layer, an elastic layer laid around the base layer and a releasing layer laid around the elastic layer. The base layer is 60 μm thick and is formed of polyimide resin (PI). The elastic layer is 300 μm thick and is formed of silicon rubber. The releasing layer is 30 μm thick and is formed of PFA (tetrafluoroethylene-perfluoroalkoxylene copolymer resin). The fixing belt 41 is stretched by the pressure pad 42, the heating roller 43 which is one example of a stretch roller and the steering roller 44. According to the present exemplary embodiment, an outer diameter of the fixing belt 41 is 120 mm for example and a rotational speed thereof is 300 mm's for example.

The pressure pad 42 is supported by the stay 45 and is pressed to the pressure roller 32 across the fixing belt 41. The stay 45 is formed of stainless steel, and both end portions in a sub-scan direction of the stay 45 are supported by the casing 31 of the fixing unit 30. It is noted that the sub-scan direction is a direction orthogonal to a conveyance direction of the recording material S that has passed through a fixing nip portion N and is a rotation axial direction of the fixing belt 41 for example. The fixing nip portion N which is one example of a nip portion is formed by contact portion of the fixing belt 41 and the pressure roller 32. That is, the pressure pad 42 is disposed so as to face the pressure roller 32 across the fixing belt 41 and forms the fixing nip portion N between the fixing belt 41 and the pressure roller 32.

The pressure pad 42 is made from LCP (liquid crystal polymer) resin for example. A lubricating sheet not illustrated is interposed between the pressure pad 42 and the fixing belt 41. The lubricating sheet is made from a PI (polyimide) sheet coated by PTFE (polytetrafluoroethylene) of 100 μm thick for example. Projections of 100 μm are formed on the PI sheet at intervals of 1 mm to reduce sliding resistance by reducing a contact area with the fixing belt 41. Lubricant is applied to an inner surface of the fixing belt 41 such that the fixing belt 41 slides smoothly against the pressure pad 42.

Lubricant not illustrated is applied in advance to the lubricating sheet on a side of a contact surface with the fixing belt 41 to improve slidability. Oil is used as the lubricant in the present exemplary embodiment. While silicon oil is preferably used as the oil from an aspect of heat resistance and others and while oils of various viscosities are used, normally oil of 30,000 cSt or less is used because fluidity during application is inferior if the viscosity is too high. Specifically, while dimethyl silicon oil, amino-modified silicon oil, fluorine-modified silicon oil or the like is used as the oil, the oil of the present disclosure is not specifically limited to them.

The heating roller 43 is a stainless steel pipe of 1 mm thick and includes a heater not illustrated and composed of a halogen heater for example. The heating roller 43 can be heated up to a predetermined temperature, e.g., 180° C. The fixing belt 41 is heated by the heating roller 43 and is controlled up to a predetermined target temperature corresponding to a type of a sheet based on temperature detected by a thermistor not illustrated. Still further, a gear not illustrated is fixed to one end portion in a rotation axial direction of the heating roller 43 to connect with the driving motor MI (see FIG. 2) through the gear to be rotationally driven. The fixing belt 41 is rotated following the rotation of the heating roller 43. Although a case where the heater can heat the fixing belt 41 is described in the present exemplary embodiment, the present disclosure is not limited to such configuration and the heater may heat at least one of the fixing belt 41 and the pressure roller 32.

The steering roller 44 has a pivot axis in an approximately vertical direction at one end portion or near a center part in a rotation axial direction thereof and pivots with respect to the fixing belt 41 to generate a difference in tension in a main scanning direction and to adjust a position in the main scanning direction of the fixing belt 41. It is noted that the steering roller 44 is a tension roller urged by an urging spring not illustrated and supported by a frame of the heating portion 40 to apply a predetermined tension to the fixing belt 41.

The pressure roller 32 faces the fixing belt 41 to contact with each other and forms the fixing nip portion N pressed between the pressure roller 32 and the fixing belt 41. The pressure roller 32 is a roller which includes an elastic layer formed around a shaft of the pressure roller 32 and a releasing layer formed around the elastic layer. The shaft of the pressure roller 32 is made from stainless steel, and conductive silicon rubber of 5 mm thick is used as the elastic layer. The releasing layer is 50 μm thick and is formed of PFA (tetrafluoroethylene-perfluoroalkoxylene copolymer resin) as fluororesin. The pressure roller 32 is axially supported by the casing 31 of the fixing unit 30. A gear not illustrated is fixed at one end portion in the rotation axial direction of the pressure roller 32 to be connected with the dnving motor MI (see FIG. 2) through the gear to be rotationally driven.

The toner image on the recording material S is heated while being nipping and conveyed at the fixing nip portion N formed between the fixing belt 41 and the pressure roller 32 as illustrated in FIG. 1. Thus, the fixing unit 30 fixes the toner image onto the recording material S while nipping and conveying the recording material S. Accordingly, the fixing unit 30 is required to achieve the both functions of applying heat and pressure and of conveying the recording material S.

The pressure roller 32 is pressed by a pressure spring not illustrated through a pressure frame not illustrated. Because the pressure frame moves to a side of the heating portion 40 after fixing the stay 45 to the casing 31, the pressure roller 32 is pressed to the pressure pad 42 through the fixing belt 41. A pressurizing force of the pressure roller 32 applied to the pressure pad 42 during the image forming process is set at 1,000 N for example. Still further, a separating member 46 configured to separate the recording material S that has passed through the fixing nip portion N from the fixing belt 41 is swingably supported by the casing 31. While the separating member 46 is a rectangular plate-like member along the rotation axial direction, one or a plurality of contact type separation claws may be disposed depending on conditions of adhesive strength between the recording material S and the fixing belt 41 and of the toner image.

The casing 31 includes a main body 33 and a cover 34 provided above the main body 33 to be openable/closable and stores the heating portion 40 and the pressure roller 32. The casing 31 also includes a carry-n port 36 for carrying in the recording material S and a sheet discharge port 37 for discharging the recording material S that has passed through the fixing nip portion N. The sheet discharge port 37 is provided at aside portion 31*a* downstream in the conveyance direction of the casing 31. A sheet conveyance path 38 which is a straight conveyance path for carrying in and discharging the recording material S bearing the toner image to be heated and fixed is formed from the carry-in port 36 to the sheet discharge port 37. According to the present exemplary embodiment, the sheet conveyance path 38 is provided horizontally.

The casing 31 also includes an opening portion 31*b* that permits to access to the sheet conveyance path 38 downstream in the conveyance direction from the fixing nip portion N at the side portion 31*a* and a door 35 serving as one example of an opening and closing member capable of opening/closing the opening portion 31*b*. The door 35 is provided to be able to open/close the casing 31 to facilitate a jam treatment. The sheet discharge port 37 is provided through the door 35 according to the present exemplary embodiment.

A carry-in side guide portion 39 is provided along the sheet conveyance path 38 between the carry-in port 36 and the fixing nip portion N. A discharge side guide portion 50 is also provided along the sheet conveyance path 38 between the fixing nip portion N and the sheet discharge port 37. The discharge side guide portion 50 includes an upper guide 51 which is one example of a first guide portion provided on an upper side of the sheet conveyance path 38 and a lower guide 52 which is one example of a second guide portion provided on a lower side of the sheet conveyance path 38. The upper and lower guide portions 51 and 52 are disposed so as to face with each other across the sheet conveyance path 38. The recording material S which has heated and fixed at the fixing nip portion N passes between the upper and lower guides 51 and 52 and is discharge out of the fixing unit 30 from the sheet discharge port 37.

Discharge Side Guide Portion

Figure 4:
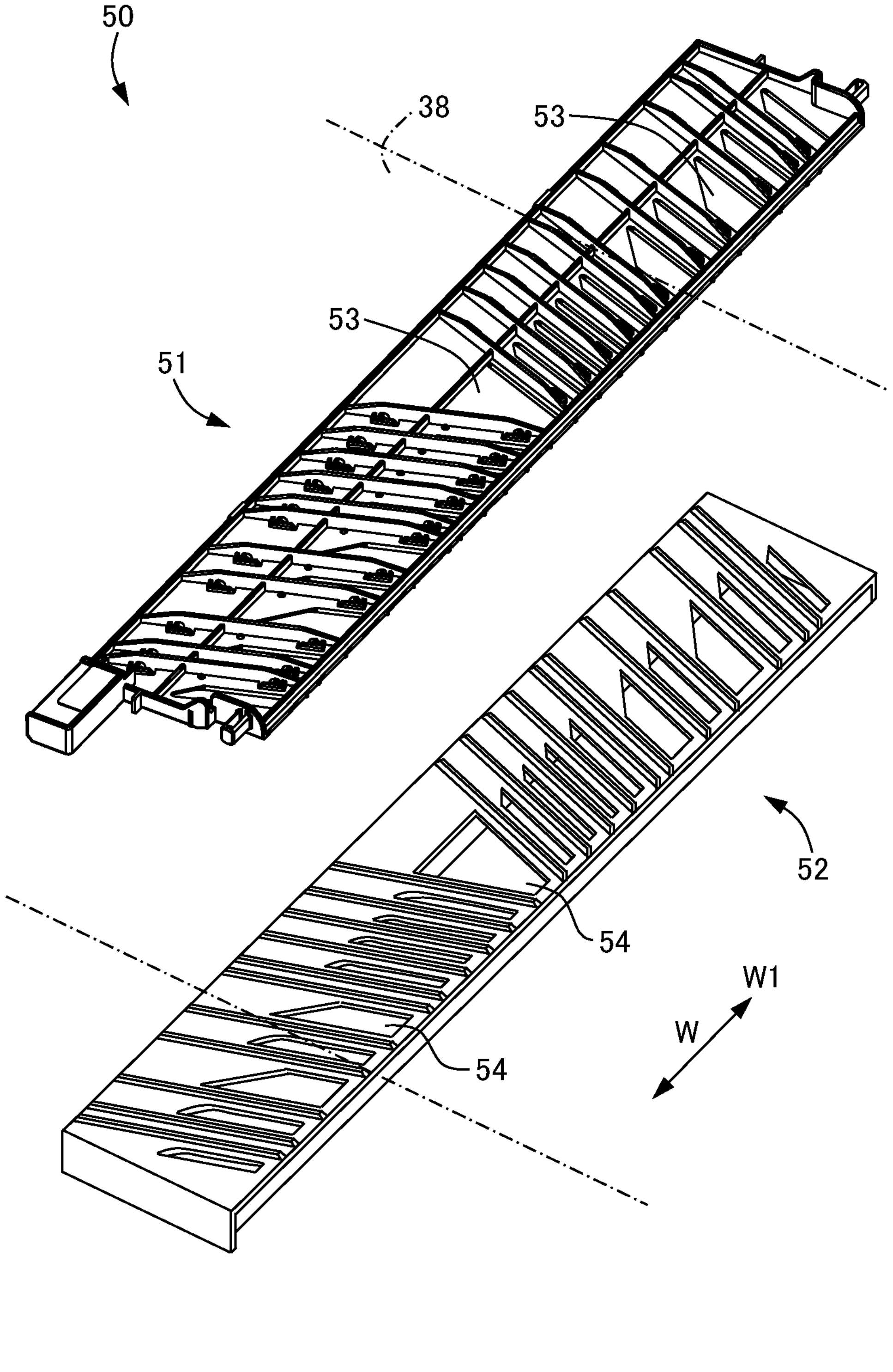
FIG. 4 is an exploded perspective view illustrating a discharge side guide member of the fixing unit according to the first exemplary embodiment.

Next, a configuration of the discharge side guide portion 50 will be detailed with reference to FIG. 4. Here, a width direction W in FIG. 4 indicates the sub-scanning direction, e.g., the rotation axial direction of the fixing belt 41. The upper and lower guides 51 and 52 are provided with the vent holes 53 and 54, respectively, such that air between the upper and lower guides 51 and 52 readily passes upward. The vent holes 53 and 54 penetrate in a direction intersecting with the sheet conveyance path 38, i.e., in a vertical direction in the present exemplary embodiment.

The vent holes 53 and 54 are provided due to the following reason. The air in a space between the upper and lower guides 51 and 52 contains a lot of moisture because the moisture contained in the recording material S is evaporated as the recording material S is nipped and heated at the fixing nip portion N between the fixing belt 41 and the pressure roller 32. Therefore, if this air is kept within the fixing unit 30, the moisture soon reaches to an amount of saturated water vapor and is condensed into dew, possibility causing various troubles such as image defects and conveyance failures. Then, the vent holes 53 and 54 are provided through the upper and lower guides 51 and 52 such that the air between the upper and lower guides 51 and 52 can be readily emitted out of the space between the upper and lower guides 51 and 52. This arrangement makes it possible to suppress the vapor generated in the process of heating and fixing the toner image from leaking out and condensing into dew within the fixing unit 30 or within post-processing apparatus located downstream in the sheet conveyance direction of the fixing unit 30.

It is noted that while the vent holes 53 and 54 are provided through the upper and lower guides 51 and 52 such that the move of the air is facilitated in the present exemplary embodiment, the present disclosure is not limited to such configuration and the move of the air may be facilitated by providing vent holes at least through one of the upper and lower guides 51 and 52. Still further, while the vent holes 53 and 54 are provided through the upper and lower guides 51 and 52 in the present exemplary embodiment, the present disclosure is not limited to the shape of holes as long as the move of the air is facilitated. For instance, ribs higher than normal ribs may be provided on sheet passing surfaces of the upper and lower guides 51 and 52 to suppress the air from being retained. Or, even if the moisture is condensed into dew, it is possible to suppress the dew condensed moisture from adhering to the recording material S by keeping the dew condensation away vertically from the recording material S.

Air Duct

Figure 5A:
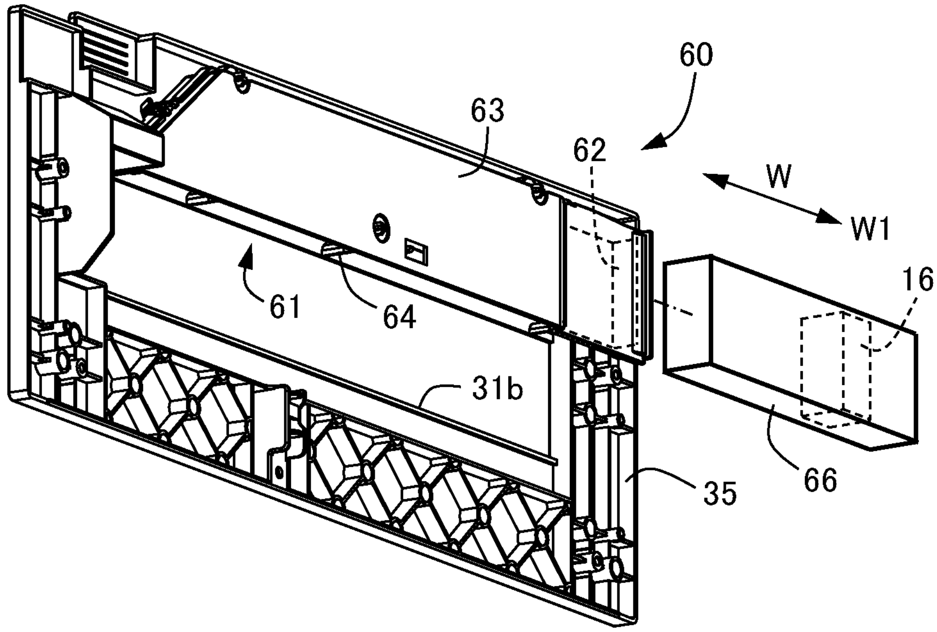
FIG. 5A is a perspective view illustrating a door of the fixing unit according to the first exemplary embodiment.
Figure 5B:
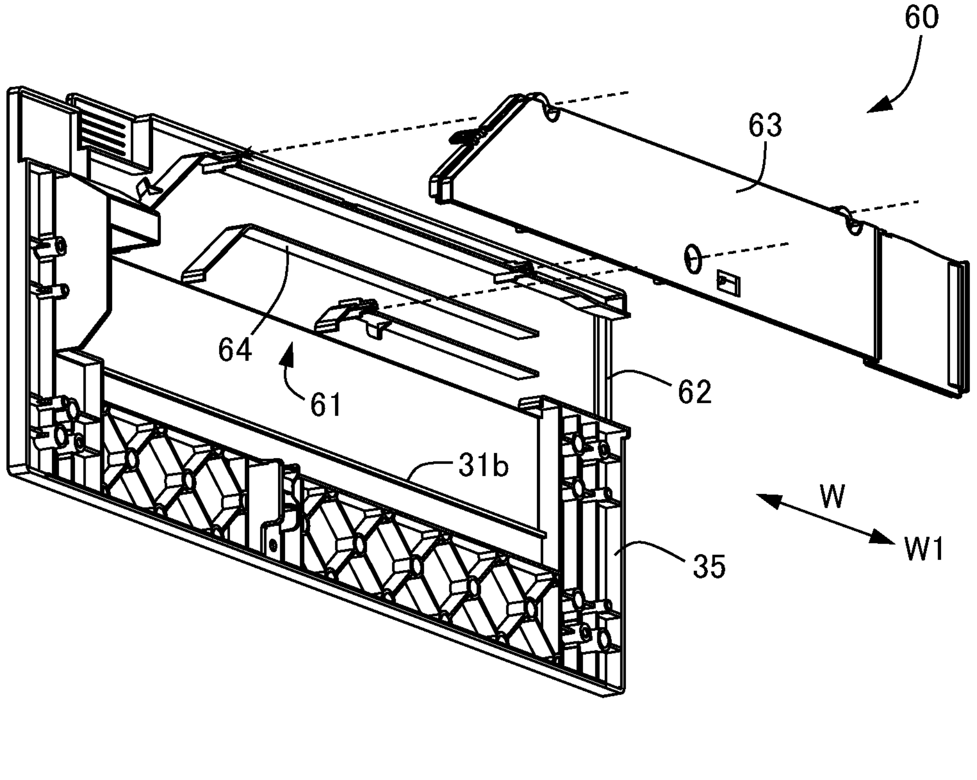
FIG. 5B is an exploded perspective view illustrating the door of the fixing unit according to the first exemplary embodiment.

Next, a configuration of an air duct 60 serving as one example of a first duct will be detailed with reference to FIGS. 5A and 5B. The air duct 60 is provided downstream of the fixing nip portion N in the conveyance direction of the recording material S within the casing 31 to suction the air containing the vapor of the recording material S generated when the recording material S is heated at the fixing nip portion N. The air duct 60 is linked with a suction fan 16 which is one example of a suction unit provided in the apparatus body 1*a* of the image forming apparatus 1 (see FIG. 1) to suction the air downstream in the conveyance direction of the fixing nip portion N of the casing 31. It is noted that the suction fan 16 may be a fan dedicated for the air duct 60 or may be a fan used also for another use. It is also noted that a main body air duct including the suction fan and provided in the apparatus body 1*a* of the image forming apparatus 1 is configured to be connected with the air duct 60 when the door 35 is closed and to be disconnected from the air duct 60 when the door 35 is opened.

The air duct 60 is provided on the door 35 and is disposed above the sheet discharge port 37. The air duct 60 includes a suction port 61 opened downward and a communicating port 62 serving as one example of an exhaust port provided on a rear side W1 of the width direction W, i.e., on a back surface side of the apparatus body 1*a*. As illustrated in FIG. 3, the suction port 61 is formed so as to face the discharge side guide portion 50. As illustrated also in FIGS. 5A and 5B, the communicating port 62 is linked with the suction fan 16. The air duct 60 is provided such that a longitudinal direction thereof extends in the width direction W such that the air containing the vapor generated from the recording material S can be suctioned across an entire range of the longitudinal direction.

In the present exemplary embodiment, the image forming apparatus 1 includes a connecting duct 66, serving as one example of a second duct, configured to connect with the communicating port 62 of the air duct 60 to exhaust air out of the image forming apparatus 1. The connecting duct 66 is separated from the air duct 60 in a state in which the door 35 opens the sheet conveyance path 38. The connecting duct 66 is connected with the air duct 60 in a state in which the door 35 closes the sheet conveyance path 38. The air duct 60 is provided to be movable in the apparatus body 1*a* and the connecting duct 66 is provided to be fixed in the apparatus body 1*a*. The suction fan 16 is provided in the connecting duct 66.

According to the present exemplary embodiment, the air duct 60 is disposed on the side of the fixing belt 41, i.e., on the side of the first rotary member or on an upper side, with respect to the sheet conveyance path 38 downstream in the conveyance direction of the fixing nip portion N. Because the air duct 60 is disposed above the sheet conveyance path 38, the air duct 60 can efficiently suction the hot air containing the vapor generated in the vicinity of the upper and lower guides 51 and 52 when the hot air rises. However, the position where the air duct 60 is disposed is not limited to the upper side of the sheet conveyance path 38 and may be disposed under the sheet conveyance path 38. It is possible to suction the air containing the vapor generated in the vicinity of the upper and lower guides 51 and 52 also in this case. The position where the air duct 60 is disposed may be the both sides above and under the sheet conveyance path 38.

The air duct 60 is formed of the door 35 of the casing 31 and a duct member 63 attached to the door 35. The duct member 63 is formed approximately into a plate-like member such that a width direction W thereof is the longitudinal direction. The duct member 63 is attached to an inner side surface of the door 35. Thus, the tubular air duct 60 is formed by the inner side surface of the door 35, the ribs 64 formed on the inner side surface of the door 35 and the duct member 63. The plurality of ribs 64 is provided from the suction port 61 to the communicating port 62 and functions as straightening ribs that rectifies the air suctioned to the air duct 60 from the suction port 61 to the communicating port 62. It is possible to suction the air uniformly across the whole range in the width direction W. i.e., in the longitudinal direction, by providing the ribs 64 as described above. While the plurality of ribs 64 which is one example of the straightening rib is provided on the door 35 in the present exemplary embodiment, the present disclosure is not limited to such arrangement and the ribs may be provided at least one of the door 35 and the duct member 63.

As described above, the fixing unit 30 of the present exemplary embodiment includes the air duct 60 provided downstream in the conveyance direction of the recording material S of the fixing nip portion N in the casing 31. Therefore, it is possible to suppress the image forming apparatus 1 from being enlarged as compared to a case where the air duct 60 is provided at a place separated from the fixing unit 30. That is, if the air duct 60 is provided at a place separated from the fixing unit 30 in the image forming apparatus 1, it is required to provide a clearance between the fixing unit 30 and the air duct 60, possibly enlarging the image forming apparatus 1. However, because such clearance is unnecessary in the fixing unit 30 of the present exemplary embodiment, the image forming apparatus 1 can be downsized. Still further, because the air duct 60 is provided on the door 35, it is possible to save a space in terms of a layout within the fixing unit 30 as compared to a case where the air duct 60 is provided at another region.

In a case where the air duct 60 is provided at a place separated from the fixing unit 30 in the image forming apparatus 1, it becomes hard to remove the vapor generated from the recording material S right after passing through the fixing nip portion N. However, because the air duct 60 is provided in the casing 31 in the fixing unit 30 of the present exemplary embodiment, it is possible to efficiently remove the vapor generated from the recording material S right after passing through the fixing nip portion N. Still more, because the air duct 60 is provided separately from the fixing nip portion N, it is possible to suppress heat necessary for fixing the recording material S at the fixing nip portion N from being lost.

Still further, the vent holes 53 and 54 are provided through the upper and lower guides 51 and 52 in the fixing unit 30 of the present exemplary embodiment. This arrangement makes it possible to readily suction the air containing the vapor accumulated between the upper and lower guides 51 and 52 upward by the air duct 60. Therefore, because the vapor generated in the heating and fixing process does not leak out of the sheet discharge port 37, is not accumulated between the upper and lower guides 51 and 52 and can be efficiently suctioned by the air duct 60, it is possible to suppress the dew condensation from being otherwise generated within the fixing unit 30.

It is noted that while the case where the air duct 60 is formed by the door 35 and the duct member 63 has been described in the fixing unit 30 of the present exemplary embodiment described above, the present disclosure is not limited to such configuration. For instance, a tubular air duct may be attached to the door 35. Still further, the case where the plurality of ribs 64 serving as the straightening rib is provided within the air duct 60 has been described in the fixing unit 30 of the present exemplary embodiment, the present disclosure is not limited to such configuration. The rib 64 may be one or may be eliminated.

Still further, the case where the air duct 60 is formed inside of the casing 31 has been described in the fixing unit 30 of the present exemplary embodiment described above, the present disclosure is not limited to such configuration. For instance, it is possible to obtain the air duct integrated with the casing 31 by attaching a duct member on an outer side surface of the casing 31 or by attaching a tubular air duct on an outer surface of the casing 31. In this case, the suction port of the air duct is configured to penetrate through the casing 31 and to face the sheet conveyance path 38 within the casing 31. It is possible to suppress the image forming apparatus 1 from being enlarged as compared to the case where the air duct 60 is provided at a place separated from the fixing unit 30.

Still further, while the sheet conveyance path 38 is formed horizontally in the fixing unit 30 of the present exemplary embodiment described above, the present disclosure is not limited to such configuration and the sheet conveyance path 38 may be formed vertically. In this case, the same effect with what described above may be obtained by providing the air duct 60 on a side of the horizontal direction of the discharge side guide portion 50.

Still further, while the case where the first rotary member is the fixing belt 41 and the second rotary member is the pressure roller 32 has been described in the fixing unit 30 of the present exemplary embodiment described above, the present disclosure is not limited to such configuration. For instance, the first rotary member may be a fixing roller and the second rotary member may be a pressure belt.

Second Exemplary Embodiment

Figure 6:
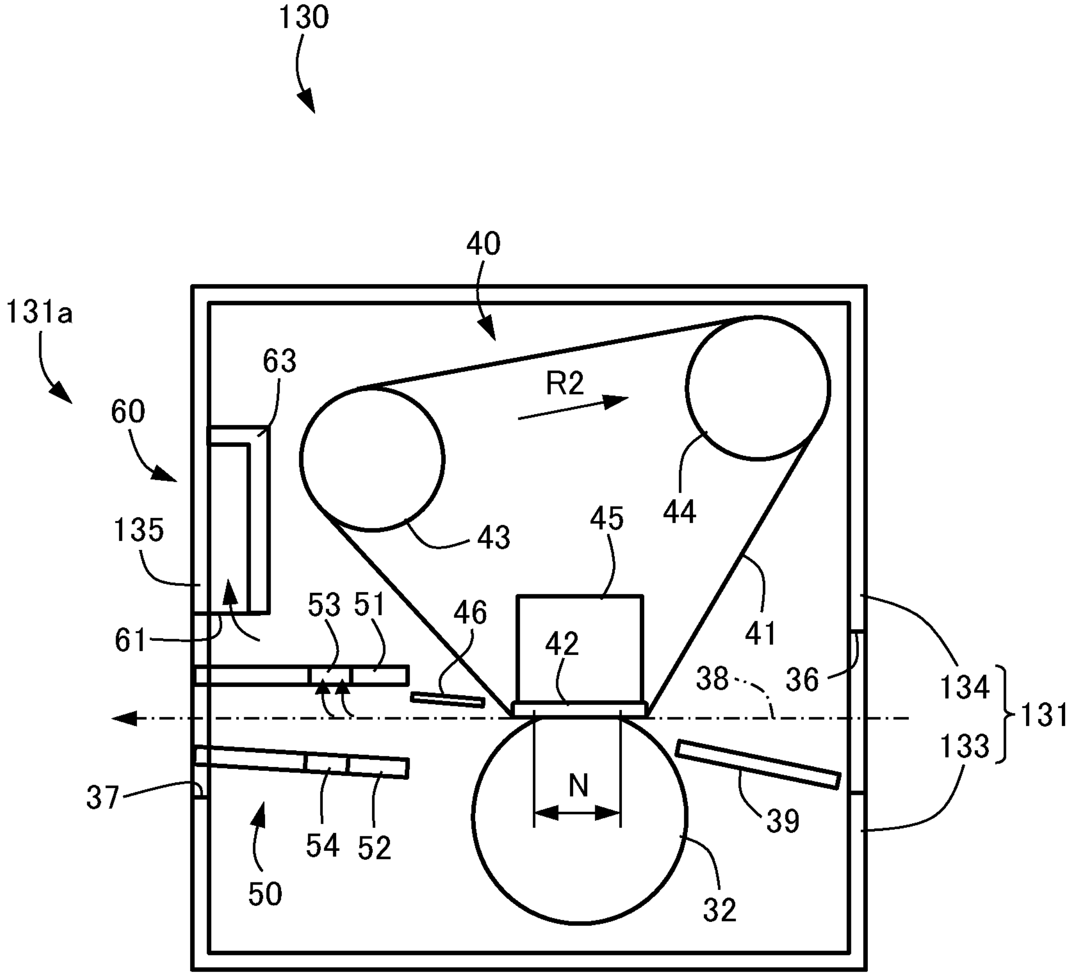
FIG. 6 is a section view illustrating a fixing unit of a second exemplary embodiment.

Next, a second exemplary embodiment of the present disclosure will be detailed with reference to FIG. 6. A configuration of the present exemplary embodiment is different from that of the first exemplary embodiment in that a casing 131 of a fixing unit 130 includes a main body 133 and a cover 134 and includes no door. The configuration of the second exemplary embodiment is the same with that of the first exemplary embodiment other than that, components of the second exemplary embodiment will be denoted by the same reference signs and their detailed description will be omitted here.

According to the present exemplary embodiment, the cover 134 covers the sheet conveyance path 38 and forms the carry-in port 36 and the sheet discharge port 37 between the main body 133. The sheet discharge port 37 is provided on a side 131*a* downstream in the conveyance direction of the casing 131. The air duct 60 is provided on a side wall 135 of the side portion 131*a* of the casing 131 and is disposed above the sheet discharge port 37. The air duct 60 is composed of the side wall 135 of the casing 131 and the duct member 63 attached to the side wall 135. The other configuration of the air duct 60 is the same with that of the first exemplary embodiment.

It is possible to suppress the image forming apparatus 1 from being enlarged also by the fixing unit 130 of the present exemplary embodiment as compared to a case where the air duct 60 is provided at a place separated from the fixing unit 130 as well as the first exemplary embodiment. Still further, because the air duct 60 is provided on the side wall 135, it is possible to save a space in terms of a layout within the fixing unit 130 as compared to a case where the air duct 60 is provided at another region.

Third Exemplary Embodiment

Next, a third exemplary embodiment of the present disclosure will be described in detail with reference to FIG. 7A. In the present exemplary embodiment, a post-processing apparatus 9 is connected to the image forming apparatus 1 to which the fixing unit 30 of the first exemplary embodiment is applied. Because the configuration of the fixing unit 30 is the same with that of the first exemplary embodiment, the components are denoted by the same reference signs and their detailed description will be omitted here. Note that a sheet discharging apparatus such as a sorter, a cooling unit and others are widely applicable as the post-processing apparatus 9.

Here, a case where a fixing unit 230 of the image forming apparatus 101 has no air duct 60 as illustrated by a comparative example in FIG. 7B will be described. In this case, the vapor of the recording material S is liable to condensed to dew on a discharge side guide portion 50 downstream in the conveyance direction of the fixing nip portion N (see FIG. 3) and on guide plates 191 and 192 of the post-processing apparatus 109. Although an air duct 160 may be provided upstream of the guide plates 191 and 192 in the post-processing apparatus 109 in order to solve this problem, it is unable to suppress dew condensation at the discharge side guide portion 50 of the fixing unit 230. In the same manner, it is unable to suppress dew condensation on the discharge side guide portion 50 of the fixing unit 230 even if an air duct is provided between the fixing unit 230 and a sheet discharge port of the image forming apparatus 101.

Figure 7A:
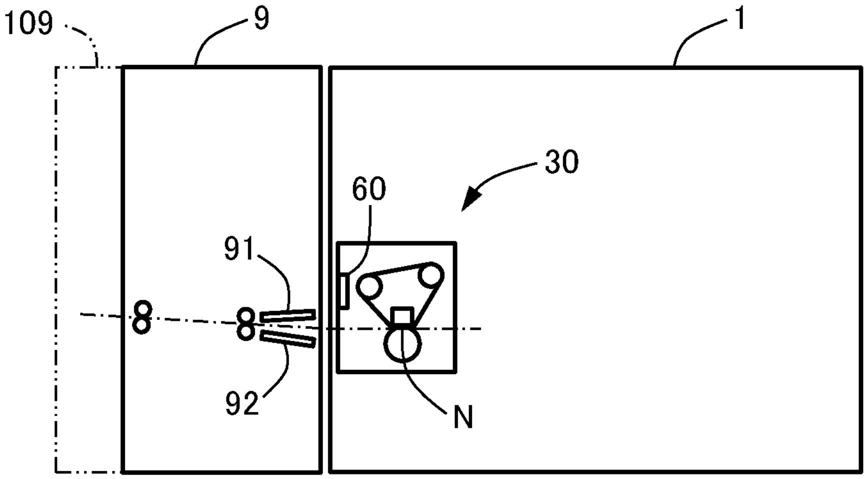
FIG. 7A is a section view schematically illustrating a configuration of an image forming apparatus and a post-processing apparatus according to a third exemplary embodiment.
Figure 7B:
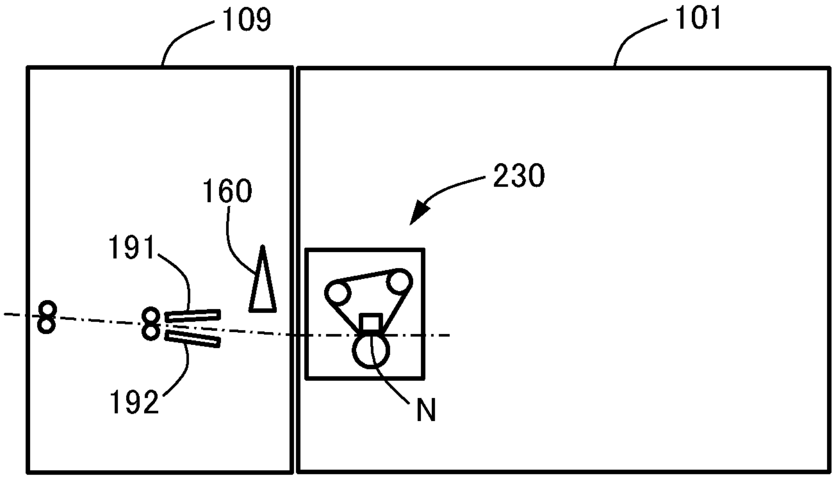
FIG. 7B is a section view schematically illustrating a configuration of an image forming apparatus and a post-processing apparatus according to a comparative example.

Then, it becomes unnecessary to provide an air duct in the post-processing apparatus 9 because the air duct 60 is provided in the fixing unit 30 by applying the fixing unit 30 of the first exemplary embodiment as illustrated in FIG. 7A. This arrangement makes it possible to downsize the post-processing apparatus 9 as compared to the post-processing apparatus 109 including the air duct 160 as illustrated in FIG. 7B. This arrangement makes it also possible to efficiently suction the vapor generated from the recording material S after passing through the fixing nip portion N and to reduce the dew condensation from being generated in the entire region downstream in the conveyance direction of the fixing nip portion N.

Figure 9:
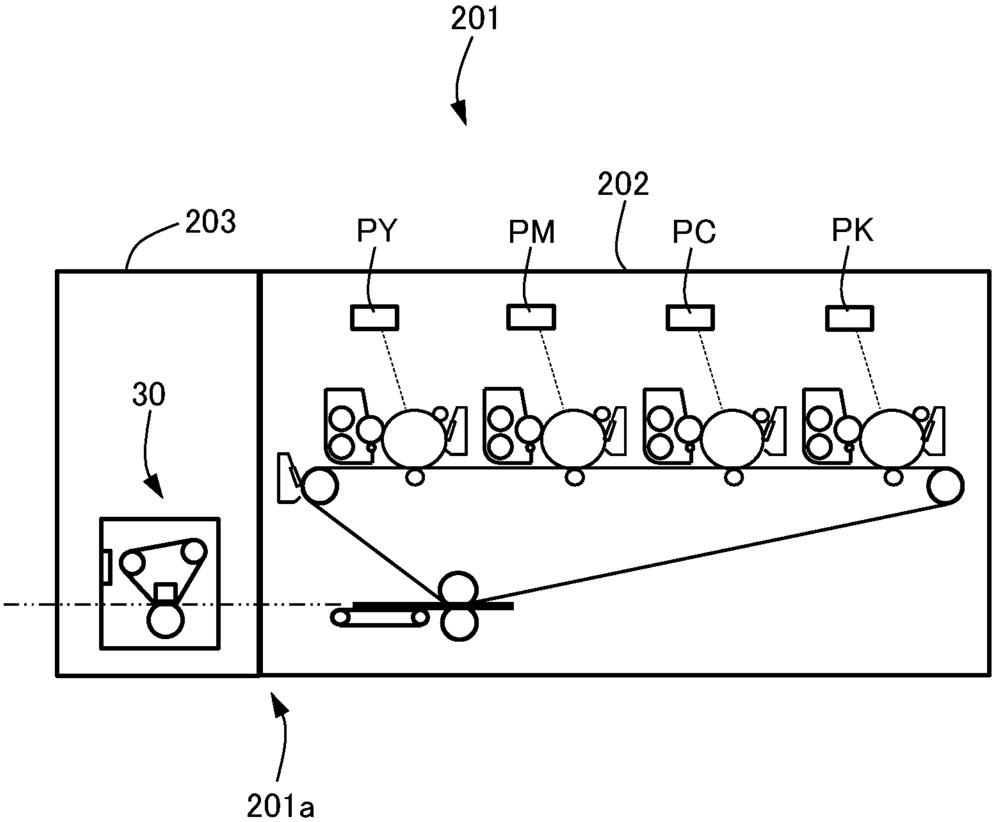
FIG. 9 is a section view illustrating a schematic configuration of an image forming apparatus of a modification example.

The image forming apparatus 1 described above in the exemplary embodiments have had a configuration in which the image forming units PY, PM, PC and PK configured to form a toner image and a fixing unit 30 configured to fix the toner image on a recording material are stored in the same casing. However, the present disclosure is not limited to such configuration and has the same effect even if the configuration of the present disclosure is adopted to a configuration of an image forming apparatus 201 in which a first apparatus 202 having a casing including an image forming units PY. PM, PC and PK is combined with a second apparatus 203 having a casing including a fixing unit 30 as illustrated in FIG. 9. In this case, an apparatus body 201*a* of the image forming apparatus 201 is formed by combining a body of the first apparatus 202 and a body of the second apparatus 203.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-123051, filed Jul. 17, 2020 which is hereby incorporated by reference herein in its entirety.

What is claimed is:

1. An image forming apparatus comprising:

an apparatus body;

a rotatable first rotary member configured to come into contact with a toner image formed on a recording material and to heat and fix the toner image onto the recording material;

a rotatable second rotary member configured to form a nip portion to nip and convey the recording material together with the first rotary member, the second rotary member being disposed below the first rotary member in a vertical direction;

a first casing provided within the apparatus body and storing the first and second rotary members;

a sheet discharge port configured to discharge the recording material that has passed through the nip portion out of the first casing;

a side portion comprising a part of the first casing and provided downstream of the nip portion in a conveyance direction of the recording material, the side portion including an opening and closing door configured to open a conveyance path from the nip portion to the sheet discharge port;

a duct portion provided on the opening and closing door and comprising a suction port to suction air from a conveyance path, the suction port being provided on a same side as the first rotary member with respect to the conveyance path; and a fan configured to suction air from the suction port through the duct portion and exhaust the air out of the image forming apparatus through the duct portion, wherein the suction port includes an opening that faces downward, the air sucked in from the opening being exhausted through the duct portion.

2. The image forming apparatus according to claim 1, wherein the suction port is provided to face the conveyance path.

3. The image forming apparatus according to claim 1, further comprising a guide portion provided on the same side as the first rotary member with respect to the conveyance path, the guide portion including a through hole and guiding the recording material to the sheet discharge port, wherein the suction port faces the guide portion.

4. The image forming apparatus according to claim 1, further comprising a first apparatus including an image forming unit configured to form a toner image onto the recording material and a second apparatus including the first casing.

5. The image forming apparatus according to claim 1, wherein the duct portion is provided on the same side as the first rotary member with respect to the conveyance path.

6. The image forming apparatus according to claim 1, further comprising a straightening rib configured to straighten suctioned air within the duct portion.

7. The image forming apparatus according to claim 1, wherein the first casing is provided to be drawable out of the apparatus body.

8. The image forming apparatus according to claim 1, further comprising:

a post-processing apparatus disposed downstream of the side portion in the conveyance direction and configured to convey a recording material discharged from the sheet discharge port, and wherein the post-processing apparatus includes a second casing, and when viewed from above in a vertical direction, the second casing is not overlapped with the duct portion.

9. The image forming apparatus according to claim 1, wherein the duct portion includes a first duct configured to suction air from the suction port through the first duct, and a second duct connected with an exhaust port of the first duct to exhaust air out of the image forming apparatus through the second duct, wherein the second duct is separated from the first duct in a state in which the opening and closing member opens the conveyance path.

10. The image forming apparatus according to claim 9, wherein the first duct is provided to be movable in the apparatus body, and wherein the second duct is provided to be fixed in the apparatus body.

11. The image forming apparatus according to claim 9, wherein the fan is provided in the second duct.

12. The image forming apparatus according to claim 1, wherein one side surface of the duct portion is composed of a wall surface of the opening and closing door.

13. The image forming apparatus according to claim 8, wherein the second casing accommodates a cooling unit configured to cool a recording material discharged from the sheet discharge port.

14. The image forming apparatus according to claim 1, wherein the suction port is disposed above the nip portion in the vertical direction.

* * * * *